US008086954B2

(12) United States Patent
Michelstein et al.

(10) Patent No.: US 8,086,954 B2
(45) Date of Patent: Dec. 27, 2011

(54) PROGRAMMABLE OBJECT MODELS FOR BIBLIOGRAPHIES AND CITATIONS

(75) Inventors: Jennifer P Michelstein, Kirkland, WA (US); Joe K Yap, Sammamish, WA (US); Christopher W Vincent, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1045 days.

(21) Appl. No.: 11/280,101

(22) Filed: Nov. 16, 2005

(65) Prior Publication Data

US 2006/0236217 A1 Oct. 19, 2006

Related U.S. Application Data

(63) Continuation-in-part of application No. 11/109,415, filed on Apr. 19, 2005.

(51) Int. Cl.
*G06F 17/00* (2006.01)
(52) U.S. Cl. .......................... 715/234; 715/255
(58) Field of Classification Search .................. 715/234, 715/255
See application file for complete search history.

(56) References Cited

U.S. PATENT DOCUMENTS

| | | | |
|---|---|---|---|
| 5,794,001 A * | 8/1998 | Malone et al. ............ | 715/762 |
| 6,959,306 B2 | 10/2005 | Nwabueze | |
| 7,137,123 B2 * | 11/2006 | Bak et al. ............... | 719/315 |
| 7,178,097 B1 * | 2/2007 | Talluri ................. | 715/205 |
| 7,200,805 B2 | 4/2007 | Carlson et al. | |
| 2003/0046307 A1 * | 3/2003 | Rivette et al. ........... | 707/104.1 |
| 2003/0179315 A1 | 9/2003 | Collins et al. | |
| 2004/0019590 A1 | 1/2004 | Hladik, Jr. | |
| 2004/0044665 A1 | 3/2004 | Nwabueze | |
| 2004/0093323 A1 * | 5/2004 | Bluhm et al. ............ | 707/3 |
| 2004/0193459 A1 | 9/2004 | Delaney et al. | |
| 2004/0210818 A1 | 10/2004 | Jones et al. | |
| 2005/0149538 A1 | 7/2005 | Singh et al. | |
| 2005/0154699 A1 | 7/2005 | Lipkin et al. | |
| 2006/0101058 A1 | 5/2006 | Chidlovskii | |
| 2006/0112085 A1 * | 5/2006 | Zijlstra et al. .......... | 707/3 |
| 2006/0136466 A1 | 6/2006 | Weiner et al. | |
| 2006/0149720 A1 * | 7/2006 | Dehlinger ............... | 707/3 |

(Continued)

FOREIGN PATENT DOCUMENTS

JP 2002183116 6/2002

(Continued)

OTHER PUBLICATIONS

Marsalis et al.,"Building a RefWorks Database of Faculty Publications as a Liason and Collection Development Tool", Summer 2004, p. 1-5, Available: http://istl.org/04-summer/article3.html.*

(Continued)

*Primary Examiner* — Chau Nguyen
(74) *Attorney, Agent, or Firm* — Lee & Hayes, PLLC

(57) ABSTRACT

Programmable object models for bibliographies and citations enable manipulation of bibliographic information. For example, a programmable object model for one or more bibliographic sources in a document may include a manipulation module programmed to manipulate the one or more bibliographic sources in the document. The bibliographic information may be manipulated via at least one object-oriented message call. The programmable object model may also enable manipulation of bibliographic information in the context of a master list of bibliographic sources. By way of example only, bibliographic sources may be copied from a master list to a document, and vice versa, in accordance with a programmable object model.

19 Claims, 11 Drawing Sheets

U.S. PATENT DOCUMENTS

| | | | | |
|---|---|---|---|---|
| 2008/0098317 | A1* | 4/2008 | Chen et al. | 715/764 |
| 2008/0256470 | A1* | 10/2008 | Bhogal et al. | 715/764 |
| 2009/0077658 | A1* | 3/2009 | King et al. | 726/21 |
| 2009/0193442 | A2* | 7/2009 | Orton et al. | 719/328 |

FOREIGN PATENT DOCUMENTS

| | | |
|---|---|---|
| RU | 2003116932 | 12/2004 |

OTHER PUBLICATIONS

Kessler, Jane et al., "Citation Generators: Generating Bibliographies for the Next Generation", Journal of Academic Librarianship, vol. 31, Issue 4, Jul. 2005 (pp. 310-316), renumbered pp. 1-12.*

Simboli, Brian et al., Citation Managers and Citing-Cited Data, Summer 2002, pp. 1-8.*

Wilde, Erik, "References as Knowledge Management", Issues in Science and Technology Librarianship, Fall 2004, pp. 1-5.*

"Bibliography", retrieved on Dec. 8, 2006, at <<dictionary.reference.com/browse/bibliography>>, Lexico Publishing Group LLC, 2006, pp. 1-4.

"BibTeX as XML markup", retrieved on Dec. 19, 2006, at <<http://bibtexml.sourceforge.net/>>, pp. 1.

"Open standards and software for bibliographies and cataloging", retrieved on Dec. 9, 2006, at <<http://www.search.sourceforge.net/bib/openbib.html>>, pp. 1-10.

Architectural Design 2.0 of OOoBib User Interactions (UI): GUIs for Managing Citations, References and Their Sources, OpenOffice.org, Feb. 22, 2005, pp. i-v and 1-22.

CiteProc, retrieved on Aug. 15, 2008 at <<http://web.archive.org/web/*/http://bibliographic.openoffice.org/citeproc//index.html>>, Archive Version Mar. 10, 2005, pp. 1-3.

D'Arcus, et al., "OpenOffice.org 2.0 File Format Change Proposal, Improved Citation Support", Sun Microsystems, Mar. 22, 2004, pp. 1-7.

Flynn, "BiblioX, An experiment in creating a portable, extensible system for formatting bibliographic citations and references", retrieved on Aug. 15, 2008 at <<http://www.silmaril.ie/bibliox/biblioxdoc.html>>, Silmaril Consultants, Apr. 2004, Version 3, pp. 1-30.

Jaksic, Mapping of bibliographical standards into XML, John Wiley & Sons, Ltd., Jun. 7, 2004, pp. 1051-1064.

D'Arcus, et al., "Open standards and software for bibliographies and cataloging", retrieved on Dec. 9, 2006, at <<http://www.search.sourceforge.net/bib/openbib.html>>, SourceForge.net, Apr. 2004, pp. 1-10.

Translated Chinese Office Action mailed on Dec. 24, 2010 for Chinese Application No. 200680012938.9, a counterpart application for US Patent No. 7,818,668.

Translated copy of the Japanese Office Action mailed Apr. 15, 2011 for Japanese Patent Application No. 2008-507762, a counterpart foreign application of US Patent No. 7,818,668.

* cited by examiner

PRESENTING A FILE

PROGRAMMABLE OBJECT MODELS FOR BIBLIOGRAPHIES AND CITATIONS

CROSS-REFERENCE(S) TO RELATED APPLICATION(S)

This U.S. patent application is a continuation-in-part (CIP) application of prior application Ser. No. 11/109,415, filed Apr. 19, 2005. Application Ser. No. 11/109,415 and application Ser. No. 11/280,609, which is filed on even date herewith and entitled "Extensible Markup Language Schema for Bibliographies and Citations", are hereby incorporated by reference in their entirety herein.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

The ability to efficiently work with bibliographic information in conjunction with text-based applications is becoming increasingly important. This is particularly true as the number of sources cited within a given document increases and as the number of different types of available sources grows. Examples of text-based applications, which may be used to produce documents having citations, include word processors, hypertext markup language (html) editors, and so forth.

SUMMARY

Programmable object models for bibliographies and citations enable manipulation of bibliographic information. For example, a programmable object model for one or more bibliographic sources in a document may include a manipulation module programmed to manipulate the one or more bibliographic sources in the document. The bibliographic information may be manipulated via at least one object-oriented message call. The programmable object model may also enable manipulation of bibliographic information in the context of a master list of bibliographic sources. By way of example only, bibliographic sources may be copied from a master list to a document, and vice versa, in accordance with a programmable object model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, object model, application programming interface (API), arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Figure 1:
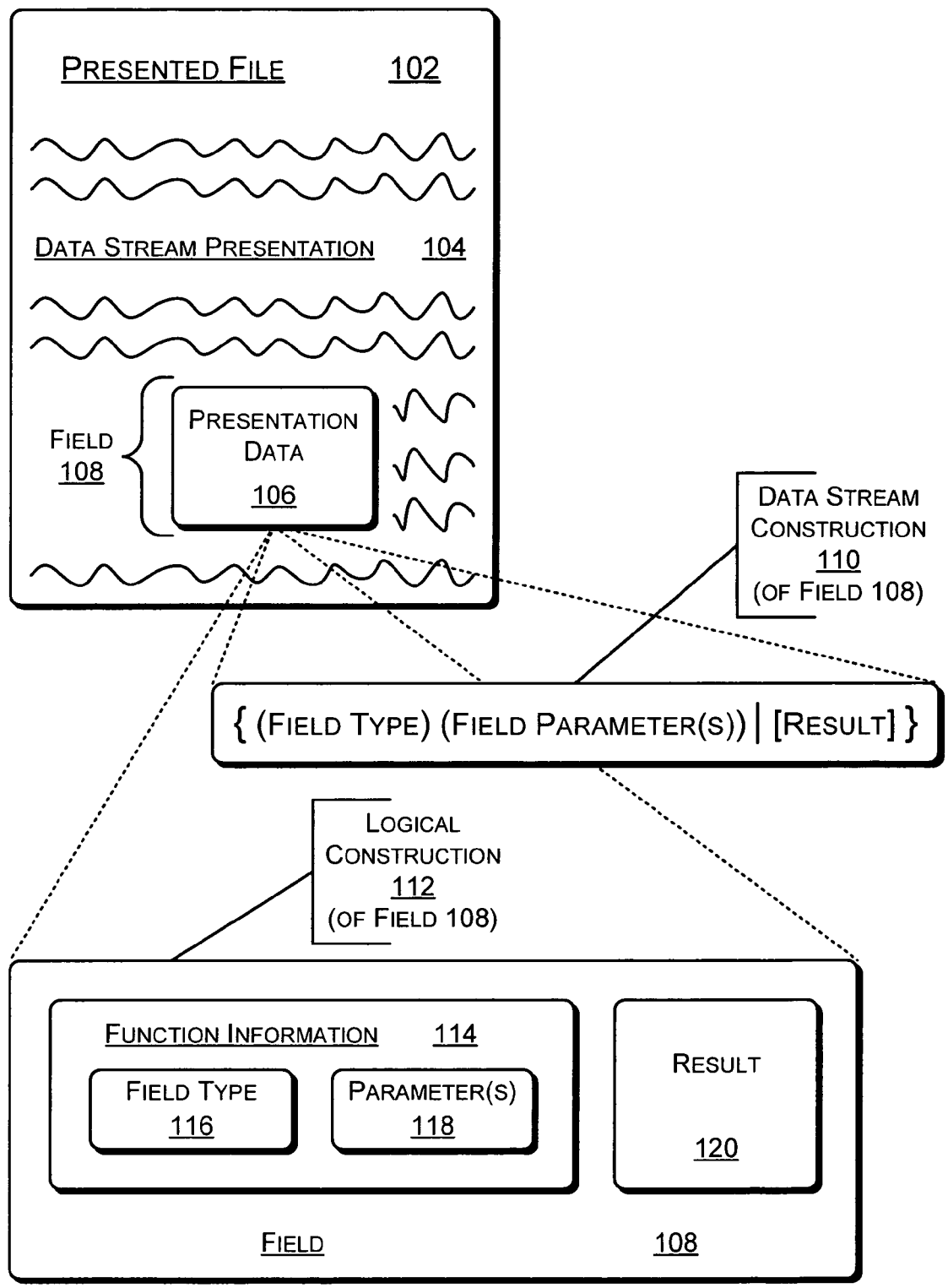
FIG. 1 is a block diagram example of a presented file including presentation data resulting from a field.

With certain implementations that are described herein, bibliographic information may be input once, edited at will, and retrieved for reuse across different documents. Moreover, the citations may be individually or collectively formatted in accordance with any of a number of different styles. In an example specific implementation, programmable object models for bibliographies and citations are described herein.

This description is separated into six additional sections. The third, fifth, and sixth sections are particularly pertinent to this continuation-in-part patent application. A first section is related to FIGS. 1-3 and is entitled "General Example Implementations for Determining Fields". A second section is related to FIGS. 4-7 and is entitled "Specific Example Implementations for Determining Fields". A third section is related to FIG. 8 and is entitled "Bibliographic-Related Example Implementations for Determining Fields". A fourth section is entitled "Conclusion for Determining Fields". A fifth section references FIG. 9 and is entitled "Example Operating Environment for Computer or Other Device". A sixth section is related to FIGS. 10-11 and is entitled "Programmable Object Models for Bibliographies and Citations".

General Example Implementations for Determining Fields

Word processing documents, for example, can include embedded fields. Fields represent a portion of a document that is visibly represented by presentation data based on a field type and at least one field parameter. The presentation data can therefore change in response to changes in the value(s) of the at least one field parameter. There can be different types of fields for different purposes. Examples include a number of pages of a document, a name of the file of the document, the current date/time, a number for a (e.g., paragraph, outline, page, etc.) numbering feature, and so forth.

When the presentation of a word processing document is updated, the presentation data is likewise updated based on the at least one parameter. For example, if there is a field for a number of pages of a document, each time the document is updated for printing, the current number of pages of the document is inserted as the presentation data at the location of the embedded field.

With existing fields, the at least one field parameter pertains to intrinsically known or determinable information. For instance, the date and/or time is intrinsically known by a computing system. Also, the file name and the internal numbering operations are intrinsically determinable from the document itself. Consequently, existing embedded field technology is limited and inflexible.

Thus, as described above, conventional embedded field technology is limited to field parameters that are determinable based on predetermined, intrinsic information. On the other hand, schemes, mechanisms, techniques, etc. that are described herein below are directed to determining fields for presentable files in a flexible and/or extensible manner.

In an example described implementation, a field can be a transform reference field type. A transformed reference field type indicates that referenced raw data is to be transformed, and the transformed raw data is then presented as the presentation data result of the field. A set of presentation rules may be selected from a transformation engine so that the referenced raw data is presented in a desired manner.

The transformation engine is independent of the application presenting the field, and the application is unaware of the specifics of the internal mechanics (e.g., the presentation rules) of the transformation engine. Moreover, a user can independently create or modify a transformation engine without utilizing the application, relying on the application, or even understanding details on how the application is to apply the transformation engine, as long as the created transformation engine adheres to or comports with a schema as promulgated for transformation engines generally. For example, using non-proprietary, open standards such as XML and XSLT enables a user to create, edit, etc. the raw data and the transformation engine, respectively, without involving the application.

Fields of a transform reference field type may be employed in a myriad of contexts. In an example context, a bibliographic feature employs transform reference field type schemes, mechanisms, techniques, etc. Raw data contains one or more bibliographic sources, and the transformation engine includes at least one set of presentation rules. Each presentation rule can implement a documented approach for citing bibliographic sources. Additionally, bibliographies and citations can be quickly repurposed by changing the selected set of presentation rules. This can cause the presentation of each cited bibliographic source to be changed accordingly.

FIG. 1 is a block diagram example of a presented file 102 having presentation data 106 resulting from a field 108. In a described implementation, presented file 102 comprises a data stream presentation 104 including presentation data 106. Presented file 102 may be from a presentable file of any type. Example presentable file types include a word processing file, a spreadsheet file, a slideshow file, an email file, a browser file, a multimedia file, some combination thereof, and so forth. Thus, data stream presentation 104 and presentation data 106 may comprise any number of symbols of any kind.

A data stream construction 110 for field 108 is illustrated. Data stream construction 110 may be represented as {(Field Type) (Field Parameter(s)) | [Result]}. The "Field Type" indicates a field type of many possible field types to which a given field 108 belongs. The "Field Parameter(s)" recite at least one field parameter that serves as an argument for the Field Type. The "Result" symbolizes the result of a function characterized by a Field Type and Field Parameter(s) pair.

By way of example only, the field type may be a paragraph reference number with the field parameter being a pointer to the referenced paragraph having a number. The result is therefore the current paragraph number of the referenced paragraph. For certain field types, the field parameter may be empty or omitted when the field type alone provides information that is sufficient to determine the result.

A logical construction 112 for field 108 is illustrated as a block diagram. Field 108 includes function information 114 and result 120. Function information 114 includes the pair of field type 116 and one or more parameters 118. When the function characterized by field type 116 and parameters 118 is evaluated or otherwise determined, result 120 is produced. When presented file 102 is updated, result 120 is presented as presentation data 106 as part of data stream presentation 104.

Figure 2:
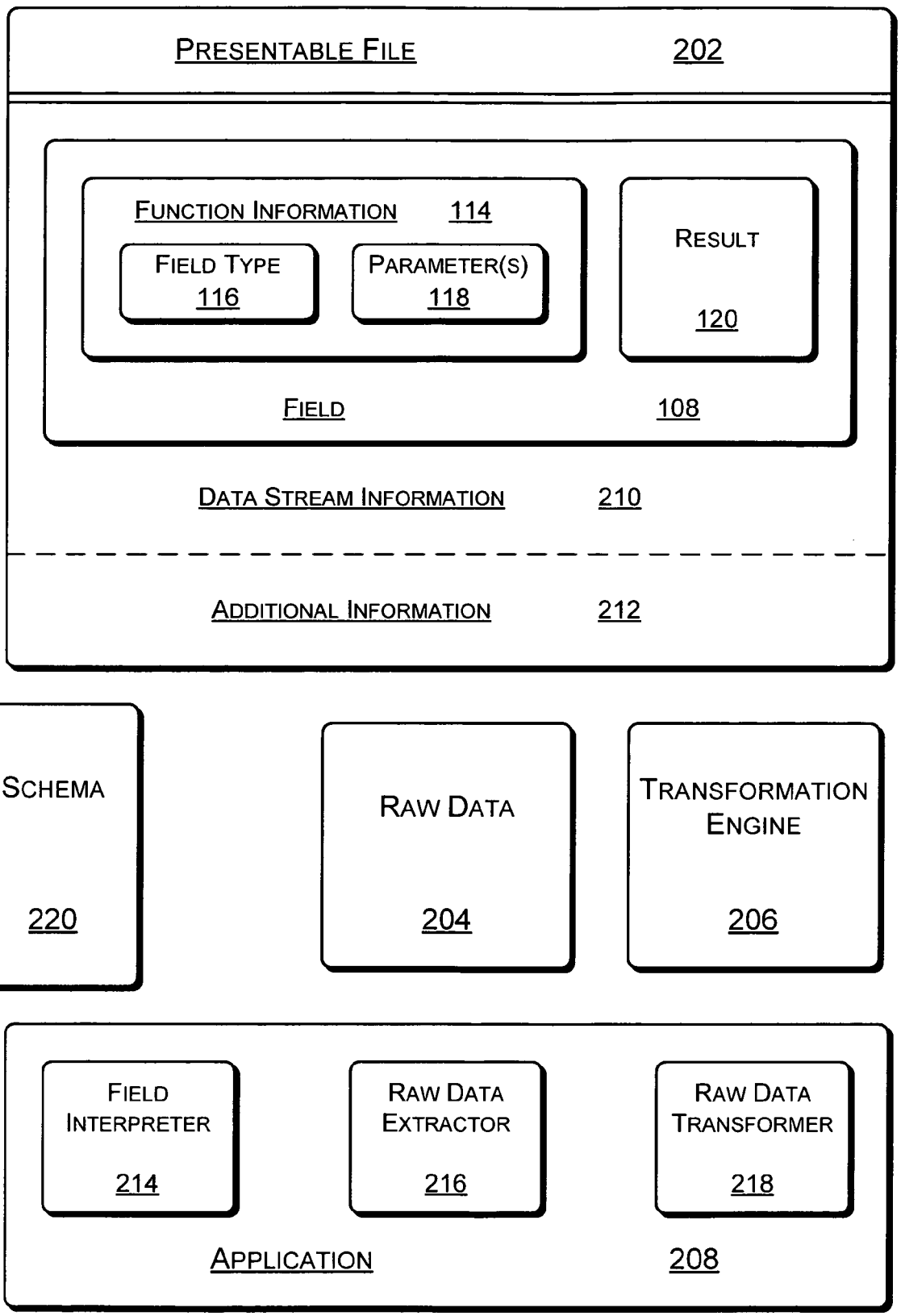
FIG. 2 is a block diagram example of a presentable file and an application that is capable of presenting the presentable file using raw data and a transformation engine.

FIG. 2 is a block diagram example of a presentable file 202 and an application 208 that is capable of presenting the presentable file 202 using raw data 204 and a transformation engine 206. In a described implementation generally, application 208 determines result 120 of field 108 based on field type 116 and at least one parameter 118 and responsive to raw data 204 and transformation engine 206.

Presentable file 202 is the origin or underlying information for presented file 102 (of FIG. 1). In other words, the information in presentable file 202 enables an application to create data stream presentation 104 (of FIG. 1) when presentable file 202 is being presented. Presentable file 202 may be presented on a visual screen, on a print out, and so forth.

As illustrated, presentable file 202 includes data stream information 210 and additional information 212. Data stream presentation 104 is produced primarily from data stream information 210. Additional information 212, if present, contains additional information that is usable for manipulating, presenting, or otherwise utilizing data stream information 210 and/or the overall presentable file 202. For example, additional information 212 may include properties information, a change history, etc. for presentable file 202. Moreover, additional information 212 can contain all or a portion of raw data 204 and/or transformation engine 206 to enhance the portability of presentable file 202, as is described further herein below with particular reference to FIG. 8.

Raw data 204 and transformation engine 206 are also illustrated in FIG. 2. Raw data 204 includes data that is to be at least partially presented as presentation data 106 (of FIG. 1) for field 108. Transformation engine 206 includes presentation rules (not explicitly shown in FIG. 2) that transform raw data 204 into result 120. Transformation engine 206, in an example implementation, complies with an open standard so that individual users may elect to modify or augment a transformation engine provided by others or to create a new transformation engine without using application 208 (which may be of any general application type, including a word processing program such as Microsoft® Word from Microsoft® Corporation). Examples of raw data 204 are described further herein below with particular reference to FIGS. 5 and 6, and examples of transformation engine 206 (including presentation rules) are described further herein below with particular reference to FIGS. 6 and 7. Also, the transformation is described further herein below with particular reference to FIGS. 6 and 7.

Application 208, in a described implementation, includes field interpreter 214, raw data extractor 216, and raw data transformer 218. Field interpreter 214 is capable of interpreting field 108, especially function information 114. Raw data extractor 216 is capable of extracting raw data from raw data 204 in accordance with a parameter 118 that contains a reference to raw data 204. Raw data transformer 218 is capable of transforming the extracted raw data in accordance with one or more presentation rules of transformation engine 206 without being in direct control of the transformation.

Raw data transformer 218 is capable of applying transformation engine 206 to the extracted data of raw data 204 without being aware of the internal mechanics (including the specifics of any included presentation rules) of transformation engine 206. Hence, result 120 of field 108 can be independent of application 208. A schema 220 is known to application 208, and application 208 is adapted to interoperate with transformation engines 206 that adhere to/comport with schema 220. Schema 220 specifies one or more formats for transformation engine 206. Consequently, as long as transformation engine 206 adheres to/comports with schema 220, raw data transformer 218 is capable of applying transformation engine 206 to raw data 204 without being aware of the internal mechanics thereof. It should be understood that application 208 may also be capable of independently interpreting other (e.g., traditional) fields 108 without relying on raw data 204 or a transformation engine 206.

As illustrated in the example block diagram of FIG. 2, raw data 204 and transformation engine 206 are separate from presentable file 202 and application 208. By way of example, raw data 204 may be a separate file, such as a separate master raw data file. Also, transformation engine 206 may be an independent file, a separate program, a plug-in module, an operating system (OS) feature, and so forth. As noted above, however, all or a portion of raw data 204 and/or transformation engine 206 may alternatively be included as part of additional information 212.

In fact, in a described implementation, at least a portion of raw data 204 is stored as part of additional information 212, and at least a portion of transformation engine 206 may be utilized by application 208 when transforming referenced raw data 204 to produce result 120. With such an implementation, at least the relevant (e.g., referenced) raw data of raw data 204 is transportable as part of presentable file 202. Consequently, a presentable file 202 may be e.g. emailed to a recipient with the relevant raw data being included as part of presentable file 202. Similarly, if the recipient has an application 208 that is expected to access and properly present presentable file 202, the inclusion of at least a portion of transformation engine 206 as a part of additional information 212 ensures that presentable file 202 can be presented in a manner intended by its creator.

Figure 3:
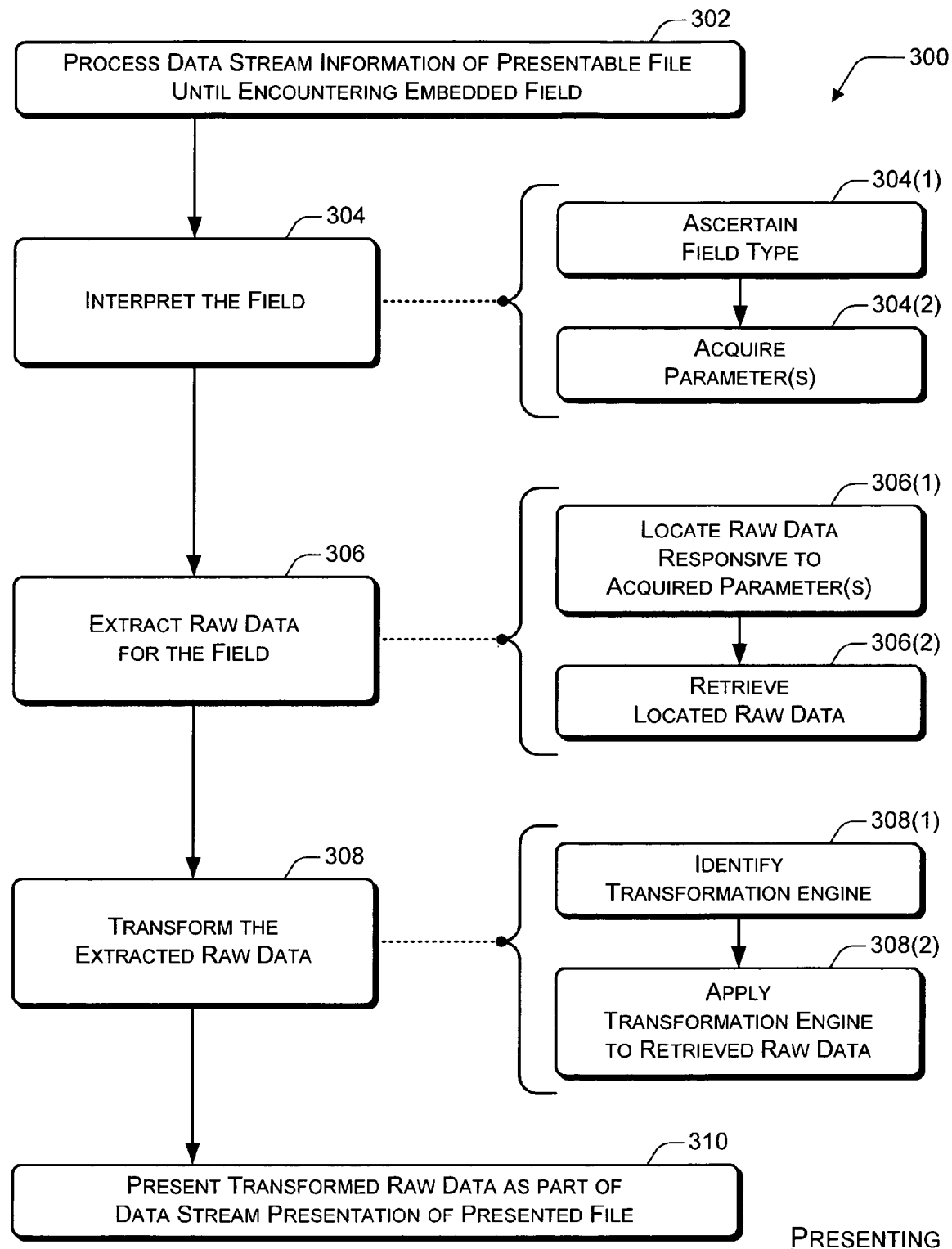
FIG. 3 is a flow diagram that illustrates an example of a method for presenting a presentable file having an embedded field.

FIG. 3 is a flow diagram 300 that illustrates an example of a method for presenting a presentable file having an embedded field. Flow diagram 300 includes five (5) "primary" blocks 302-310 and six (6) "secondary" blocks. Although the actions of flow diagram 300 may be performed in other environments and with a variety of hardware and software combinations, FIGS. 1 and 2 are used in particular to illustrate certain aspects and examples of the method. By way of example only, the actions of flow diagram 300 may be performed by an application 208 on a presentable file 202 using raw data 204 and transformation engine 206.

At block 302, data stream information of a presentable file is processed until an embedded field is encountered. For example, data stream information 210 of presentable file 202 may be processed into data stream presentation 104 of presented file 102 until a field 108 is encountered.

At block 304, the field is interpreted. For example, field interpreter 214 of application 208 may interpret field 108. More specifically, at block 304(1), a field type is ascertained. For instance, field interpreter 214 may ascertain field type 116 of function information 114. At block 304(2), one or more parameters 118 are acquired. For instance, field interpreter 214 may acquire parameter(s) 118 of function information 114.

In a described implementation, field type 116 comprises a transform reference field type 116. This indicates to field interpreter 214 that a reference points to raw data, which is to be transformed prior to presentation. Thus, at least one parameter 118 comprises a reference to raw data 204. Another parameter 118 may identify all or part of transformation engine 206. Alternatively, a transformation engine 206 that is to be employed for a presentable file 202 may be identified (and optionally contained) in the additional information 212. As another example, transformation engine 206 may be identified by a global setting that is set by or through application 208.

At block 306, raw data for the field is extracted. For example, raw data extractor 216 of application 208 may extract raw data for field 108 from raw data 204. More specifically, at block 306(1), raw data is located responsive to acquired parameter(s). For instance, raw data extractor 216 may locate raw data 204, and/or a portion thereof, responsive to at least one parameter 118 that includes a reference to the raw data. At block 306(2), the located raw data is retrieved. For instance, raw data extractor 216 may retrieve the located raw data from raw data 204.

At block 308, the extracted raw data is transformed. For example, raw data transformer 218 of application 208 may cause the extracted raw data of raw data 204 to be transformed responsive to the separate transformation engine 206. More specifically, at block 308(1), the relevant transformation engine 206 is identified. For instance, raw data transformer 218 may identify the relevant transformation engine 206, and/or the relevant presentation rules thereof, using at least one parameter 118, using a transform identification (e.g., a transformation engine identifier) in additional information 212, using a global setting of application 208, and so forth. At block 308(2), the identified transformation engine is applied to the retrieved raw data. For instance, raw data transformer 218 may apply the identified transformation engine 206, including a set of presentation rules thereof, to the retrieved raw data of raw data 204 to produce result 120. Raw data transformer 218 can cause transformation engine 206 to perform this transformation without knowing any specifics about the contents of transformation engine 206.

At block 310, the transformed raw data, or field result, is presented as part of the data stream presentation of the presented file. For example, application 208 may present result 120, which comprises the transformed raw data, as presentation data 106 for field 108 as part of presented file 102. The actions of flow diagram 300 may be performed in orders that vary from those that are illustrated. For example, the transforming of block 308 may be performed prior to or completely or partially overlapping with the extracting of block 306. Thus, in an example implementation, only those portions of the raw data that are to remain after any filtering need be fully extracted.

Specific Example Implementations for Determining Fields

Figure 4:
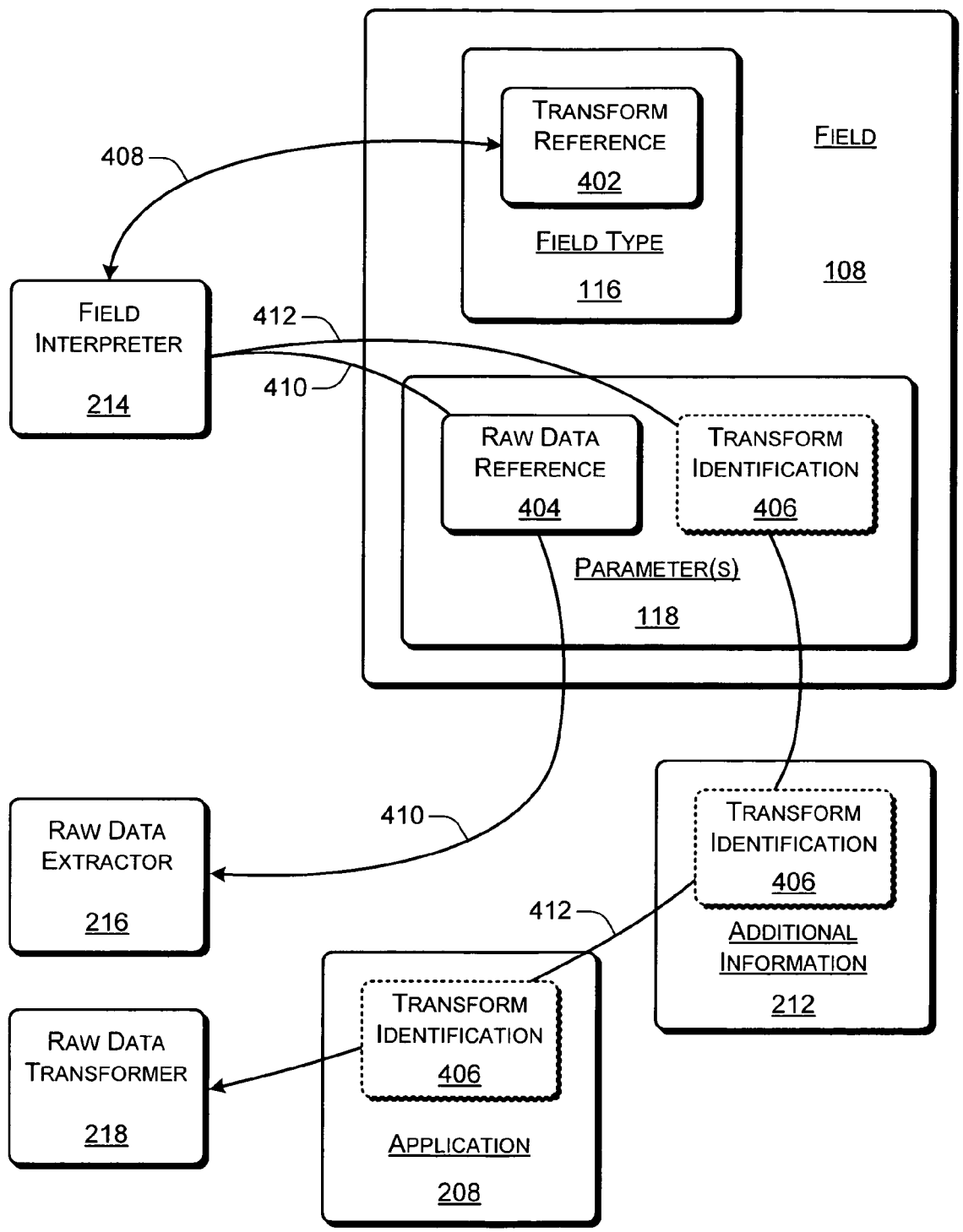
FIG. 4 is a block diagram of an example interpretation of an embedded field.

FIG. 4 is a block diagram of an example interpretation of an embedded field 108. In a described implementation, a field 108 includes a field type 116 and at least one parameter 118. As illustrated, field type 116 comprises a transform reference 402 field type, and parameter(s) 118 includes at least a raw data reference 404.

Field interpreter 214 ascertains that field type 116 is a transform reference field type 402 as indicated by arrow 408. As such, field 108 is determined based on raw data reference 404 and responsive to (i) raw data 204 (of FIG. 2) that is referenced by raw data reference 404 and (ii) transformation engine 206.

Field interpreter 214 provides raw data reference 404 to raw data extractor 216 as indicated by arrow 410. Field interpreter 214 also provides transform identification 406 to raw data transformer 218 as indicated by arrow 412. Three example locations at which transform identification 406 may be found are illustrated. These examples include parameter(s) 118, additional information 212, and application 208. However, transform identification 406 may alternatively be located within or in association with other component(s). Also, raw data transformer 218 may alternatively be capable of independently acquiring transform identification 406 from any location.

Figure 5:
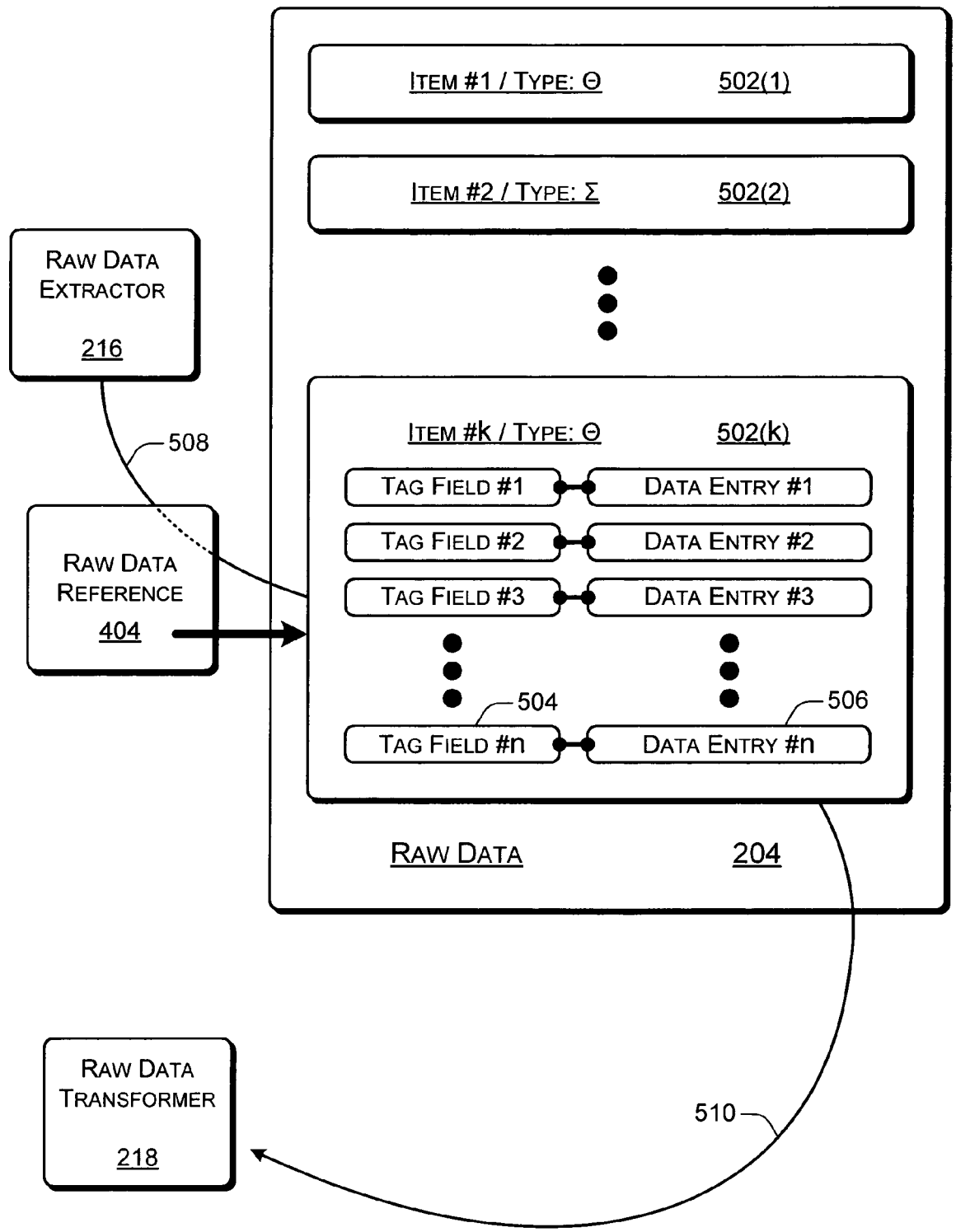
FIG. 5 is a block diagram of an example extraction of raw data for the embedded field.

FIG. 5 is a block diagram of an example extraction of raw data 204 for the embedded field. In a described implementation, raw data 204 includes one or more data items 502. As illustrated, raw data 204 includes "k" data items 502(1 ... k): item #1 502(1), item #2 502(2) ... item #k 502(k). Each data item 502 corresponds to a data item type. As shown, data item #1 502(1) corresponds to data item type "Θ", data item #2 502(2) corresponds to data item type "Σ", and data item #k 502(k) also corresponds to data item type "Θ". Data item types are described further herein below with particular reference to FIGS. 6 and 7.

Data items 502 include one or more respective tag fields 504 and associated respective data 506, which are referred to herein as tag-data couplets. As illustrated, data item #k 502(k) includes "n" respective tag fields 504 that are associated with "n" respective data entries 506. In other words, tag field #1 is associated with data entry #1, tag field #2 is associated with data entry #2, tag field #3 is associated with data entry #3, and tag field #n is associated with data entry #n. The manner in which tag fields 504 are utilized by raw data transformer 218 is described further herein below with particular reference to FIG. 6.

As illustrated, raw data reference 404 references data item #k 502(k). Raw data reference 404 can comprise a link, a pointer, an address, a universal resource locator, a uniform resource locator, some combination thereof, and so forth. Raw data extractor 216 uses raw data reference 404 to locate and then retrieve data item #k 502(k) as indicated by arrow portion 508. Data item #k 502(k), or at least a portion thereof, is then provided to raw data transformer 218 as indicated by arrow portion 510.

Figure 6:
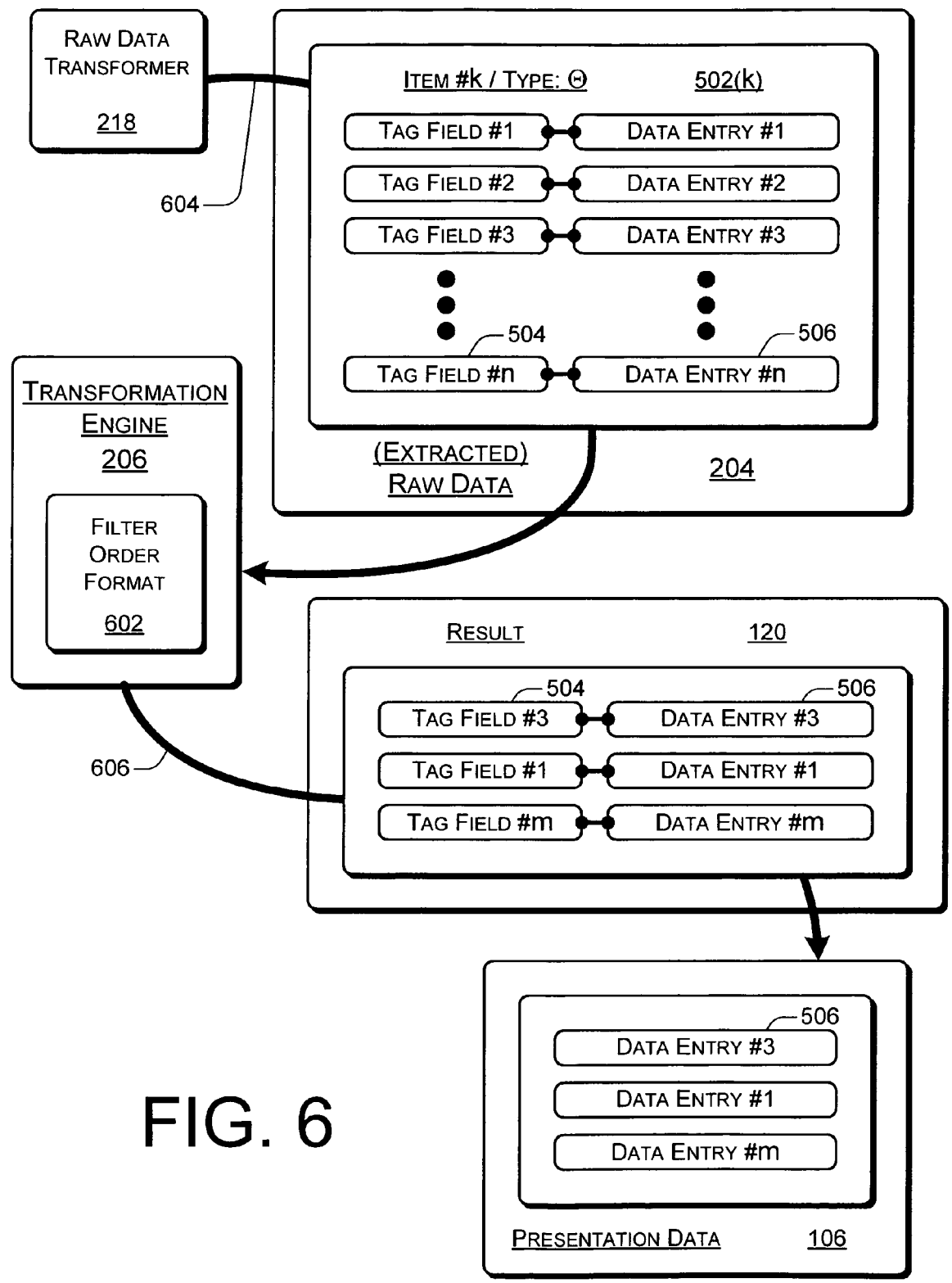
FIG. 6 is a block diagram of an example transformation of the extracted raw data.

FIG. 6 is a block diagram of an example transformation of the extracted raw data 204. In a described implementation, raw data transformer 218 applies data item #k 502(k) to transformation engine 206 as indicated by arrow 604. As illustrated, transformation engine 206 includes a filter, order, and/or format capability 602. The specifics of filter, order, and/or format capability 602 are unknown to raw data transformer 218.

Filter, order, and/or format capability 602 is adapted so as to filter, order, and/or format data item #k 502(k) with respect to tag fields 504, in accordance with a selected set of presentation rules, and responsive to a data item type of data item #k 502(k). In this example case, the selected set of presentation rules pertaining to data item type "Θ" is applied to data item #k 502(k) because it is of data item type "Θ".

Generally, presentation rules can stipulate which tag fields 504 are filtered out, how the remaining tag fields 504 are ordered, and how the surviving data entries 506 are formatted. Specifically, tag-data couplets (e.g., respective tag fields 504 that are associated with respective data entries 506) may be filtered, ordered, and/or formatted. More specifically, one or more individual tag-data couplets may be filtered out (e.g., removed and/or excluded from presentation). Also, tag-data couplets may be reordered into a prescribed order. Furthermore, tag-data couplets may be formatted such that the presented text is centered, bolded, italicized, underlined, spaced appropriately, capitalized, punctuated, some combination thereof, and so forth.

Thus, filter, order, and/or format capability 602 of transformation engine 206 produces result 120, which is presented as presentation data 106. As illustrated in FIG. 6, the tag-data couplets from #1 to #n have been filtered out except for the tag-data couplets #1, #3, and #m as shown at result 120. These couplets have also been re-ordered as follows: tag-data couplet #3, tag-data couplet #1, and tag-data couplet #m.

The data entries 506 may also be formatted individually or as a group to produce the final appearance for presentation data 106. Although result 120 is shown as including tag fields 504 in addition to data entries 506, result 120 may alternatively be streamlined by omitting tag fields 504 such that result 120 is effectively equivalent to presentation data 106. Consequently, result 120 may be presented as presentation data 106 without first stripping out tag fields 504.

Figure 7:
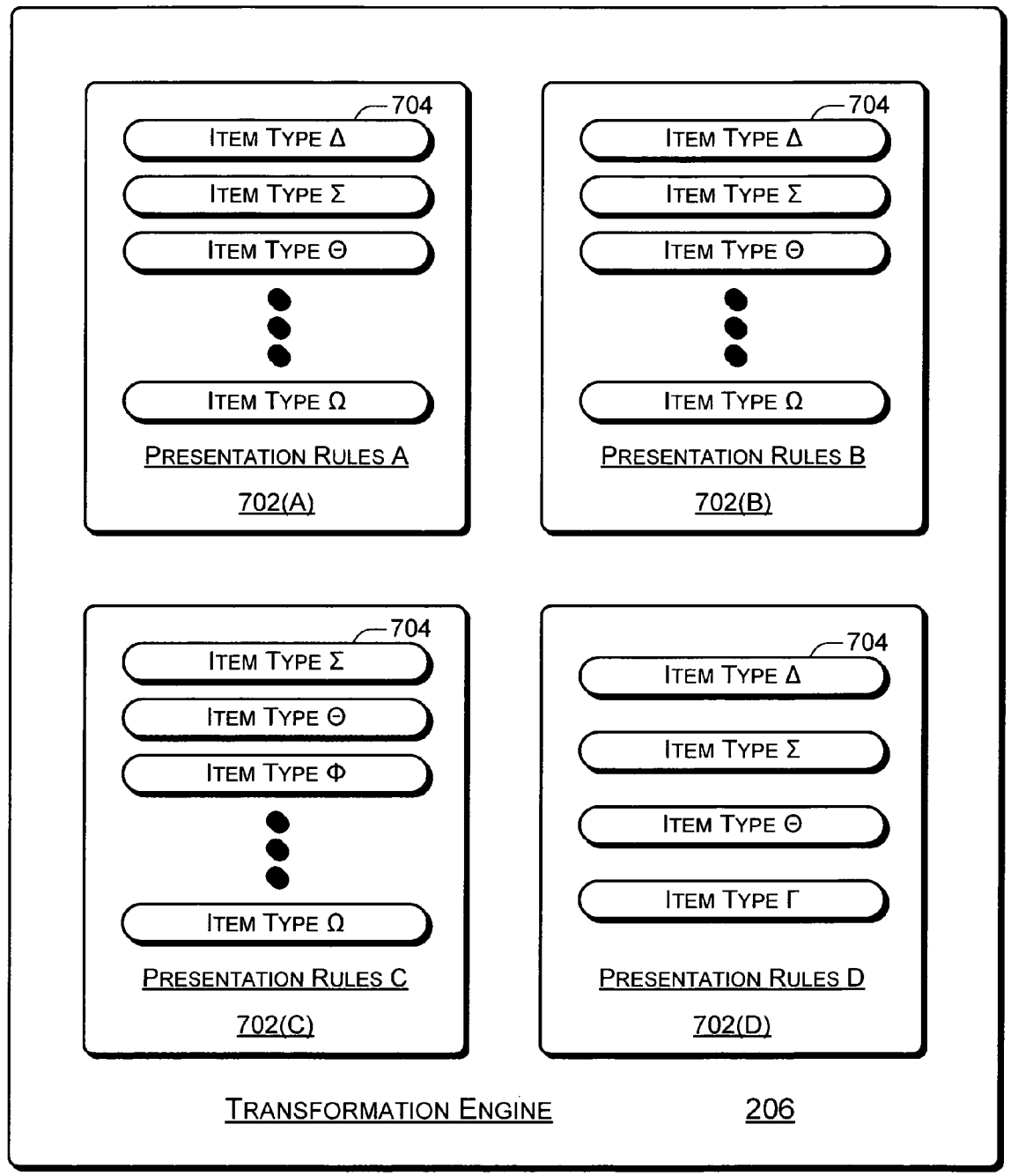
FIG. 7 is a block diagram of an example transformation engine.

FIG. 7 is a block diagram of an example transformation engine 206. In a described implementation, transformation engine 206 includes at least one set of presentation rules 702. As illustrated, transformation engine 206 includes four (4) sets of presentation rules 702: presentation rules A 702(A), presentation rules B 702(B), presentation rules C 702(C), and presentation rules D 702(D). However, transformation engine 206 may alternatively have fewer or more than four sets of presentation rules 702.

With reference to the set of presentation rules A 702(A), there is a different subset 704 of presentation rules for each data item type of multiple data item types. As illustrated, presentation rules A 702(A) includes rule subsets 704 that target data items of type Δ, type Σ, type Θ ... type Ω. The presentation rule subsets 704 for each data item type may include their own set of filter, order, and/or format capability 602. Consequently, data entries 506 that are associated with the same kind of tag field 504 may be filtered, ordered, and/or formatted differently if they are part of data items 502 that correspond to different data item types. This is further explained by way of example in the following section with the bibliographic-related examples.

Transform identification 406 (of FIG. 4) may identify an individual set of presentation rules 702 of a transformation engine 206. If the set of presentation rules 702 is globally established (e.g., by application 208 or additional information 212), then fields 108 of the transform reference 402 field type are each presented in accordance with the globally established set of presentation rules 702. Alternatively, the set of presentation rules 702 to be used may be established for each field (e.g., with a parameter 118), for each section or area of a file (e.g., also possibly identified in additional information 212), or in any other manner.

Although both sets of presentation rules A and B 702(A and B) as illustrated in the transformation engine 206 of FIG. 7 apparently include the same presentation rule subsets 704, presentation rule subsets 704 may differ. For example, presentation rules C 702(C) does not include a presentation rules subset 704 for data items 502 of type Δ, but it does have a presentation rules subset 704 for data items 502 of type Φ. Also, presentation rules D 702(D) only includes presentation rule subsets 704 for data items 502 of types Δ, Σ, Θ, and Γ. Furthermore, a presentation rule subset 704 for a given data item type may be exclusive to a single set of presentation rules 702. Other combinations and permutations of presentation rule sets 702 and presentation rule subsets 704 are possible.

Bibliographic-Related Example Implementations for Determining Fields

An example application for determining fields, in accordance with certain implementations as described herein above, is in a bibliographic context. Bibliographic data for cited sources may be entered once, and the bibliographic data may subsequently be used for footnotes, endnotes, and so forth. A user can retrieve bibliographic data for a citation or bibliography entry to a given source whenever that source data has been entered.

Moreover, cited sources within a presentable file 202 are included within data stream information 210 as fields 108 having a field type 116 of transform reference 402. Accordingly, bibliographic data may be extracted from raw data 204. Additionally, the raw bibliographic data 204 may be transformed in accordance with an established presentation rule 702. The presented file 102 may then be re-purposed merely be selecting a different presentation rule 702. In other words, the user can insert a citation or bibliographic entry, pulling raw data (the source data) and transforming it according to a documentation style such as MLA or APA. After a citation or bibliographic entry is inserted, it can be repurposed by selecting a different documentation style (transform).

Figure 8:
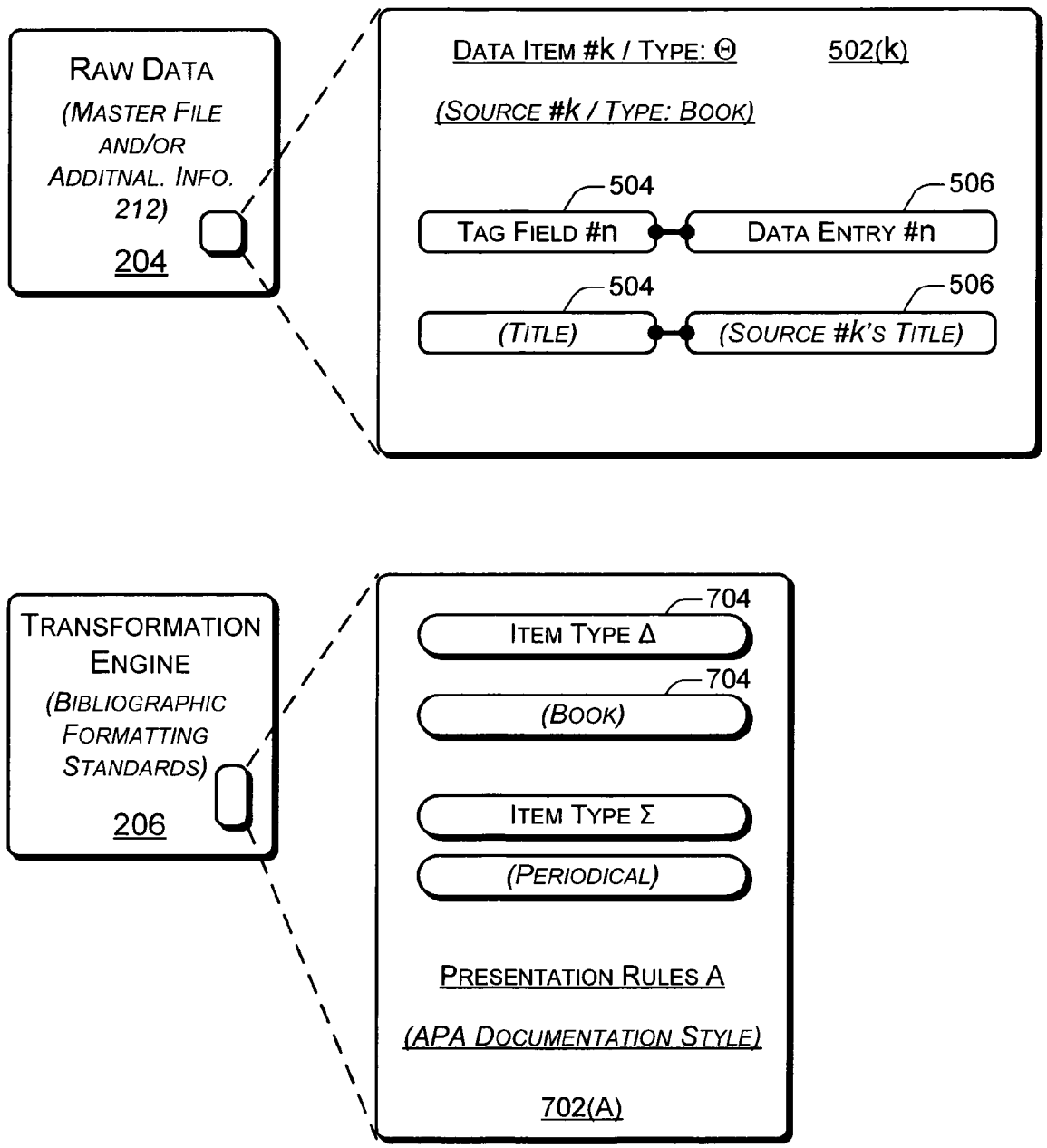
FIG. 8 is a block diagram that provides bibliographic-related examples for the more general concepts and terms illustrated in FIGS. 1-7.

FIG. 8 is a block diagram that provides bibliographic-related examples for the more general concepts and terms illustrated in FIGS. 1-7. The bibliographic-related examples and realizations are annotated in the illustration of FIG. 8 with italicized text. FIG. 8 includes raw data 204 and transformation engine 206. Although raw data 204 may be implemented in various ways, in a described implementation raw data 204 comprises an extensible markup language (XML) file or a portion of a file that is configured in accordance with XML. Similarly, transformation engine 206 comprises an extensible stylesheet language (XSLT) file or a portion of a file that is configured in accordance with XSLT in a described implementation. However, either may be realized using other mechanism(s). Using a non-proprietary, open standard such as XML and XSLT enables a user to create, edit, etc. raw data 204 and/or transformation engine 206 without using application 208.

Transformation engine 206 (e.g., as an XSLT or other non-proprietary file) is installed and/or called by application 208. However, application 208 need not be used to create or modify a transformation engine 206. Instead, a user may utilize any program that is capable of generating a file that adheres to or comports with the schema 220 that specifies available format(s) for transformation engine 206. Hence, a transformation engine 206 that is generated by an unknown file can be installed and/or called by application 208 to determine fields in presentable files. For example, a word processing program realization of application 208 may install or call any transformation engine 206 that comports with the specified schema 220, regardless of how the transformation engine 206 was created.

In a described implementation, raw data 204 may comprise a master bibliographic data file and/or a portion of additional information 212 of presentable file 202. For example, a user may enter bibliographic data directly into a master file and have cited portions thereof copied into additional information 212. Alternatively, a user may enter bibliographic data directly into additional information 212 (e.g., via an application 208) and have the bibliographic data of the newly-entered citations copied into the master file for subsequent use. As noted above, inclusion of bibliographic data in additional information 212 is an optional implementation.

Raw data 204 includes at least one data item 502. As illustrated in FIG. 8, raw data 204 includes data item #k 502(k) of type Θ. In a bibliographic-related implementation, data item #k 502(k) comprises an individual bibliographic source #k that is being cited, and the type Θ comprises a source type such as a book. Other example bibliographic source types include, but are not limited to: periodicals, journals, broadcast programs, conference proceedings, speeches, journal articles, magazine or newspaper articles, sound recordings, performances, theses/dissertations/reports, art works, musical compositions, internet sites, documents from internet sites, and so forth.

Data item #k 502(k) typically includes multiple entries. Specifically, there are respective data entries 506 that are associated with respective tag fields 504. Tag field #n 504 is shown in this example as a title for the book that is the source for this data item 502. Consequently, the associated data entry #n 506 comprises the actual title of source #k. Although only one tag-data couplet is shown in FIG. 8, there are typically multiple such couplets. Additional example bibliographic-related realizations for tag fields 504 include, but are not limited to: author, publication date, pages, publisher, chapter title, article title, volume, issue, edition, URL, performer, writer, artist, version, director, and so forth. The specific tag fields 504 that are supported may optionally vary by data item type.

In a bibliographic-related implementation, transformation engine 206 comprises one or more bibliographic formatting standards. Thus, each presentation rule 702 may be realized as an individual bibliographic formatting standard. As illustrated, presentation rules A 702(A) is realized as a set of rules that transforms raw bibliographic data into bibliographic data that comports with the American Psychological Association (APA) rules of documentation style. Other example bibliographic-related realizations for presentation rules 702 include, but are not limited to the following bibliographic standards: Modern Language Association (MLA), Chicago Manual of Style, Turabian, Author-Date, and so forth.

In such a bibliographic-related implementation, transformation engine 206 can therefore be an XSLT for MLA, APA, etc. that is installed or called by a word processing application. Other XSLTs for other bibliographic documentation styles can be created by users and then installed or called by the word processing application. Such other transformation engine 206 realizations operate in conjunction with the word processing application as long as they are created so as to adhere to the specified schema 220. The word processing application need not understand the internal mechanics of a transformation engine, and the user need not create or modify the transformation engine with the word processing application.

Because presentation rules 702 tend to differ by source type, each source type has a corresponding item type presentation rule subset 704. Consequently, book citations may be formatted differently from periodical citations. As illustrated, item type Δ 704 is realized as a presentation rules subset 704 of APA that is targeted to transforming raw data for books into book citations that comport with the APA, and item type Σ is realized as a presentation rules subset 704 of APA that is targeted to transforming raw data for periodicals into periodical citations that comport with the APA.

In operation, parameters in a presentation rules subset 704 stipulate which tag fields 504 are to be present in result 120 as well as their order. They may also stipulate the appropriate formatting, including capitalization and punctuation. More specifically, the parameters stipulate which ones of data entries 506 are to be presented as presentation data 106 of presented file 102.

Conclusion for Determining Fields

In a described implementation, a transformation engine is created in accordance with a selected open standard (e.g., XSTL) so as to adhere to a given schema. The given schema is associated with a given application. The given schema specifies a format for transformation engines with which the given application is capable of interoperating.

Thus, the given application is adapted to apply the transformation engine to fields of a presentable file (e.g., by installing and/or calling the transformation engine). The fields may be determined by the given application based on a field type and at least one parameter of the field, as well as responsive to raw data and the transformation engine. This determination may be effectuated by the application even if the application is unaware of the internal mechanics of the transformation engine.

The transformation engine may be created, modified, etc. by a user without utilizing the given application. The creation and/or modification is performed such that the resulting transformation engine comports with the given schema. The user may utilize any program that is capable of manipulating files for transformation engines of the selected open standard type.

By way of example only, the fields being determined can be bibliographic-related entries for a word processing document. The raw data, which may be formatted in accordance with an open standard such as XML, may include bibliographic-related data. The transformation engine may comprise one or more bibliographic citation styles, such as APA and MLA. A user may create his or her own bibliographic citation style or modify a documented one without utilizing the word processing application. Regardless, the word processing application may determine bibliographic-related fields of the word processing document by applying a transformation engine comprising at least one bibliographic citation style without the word processing application having to understand details of the internal mechanics of the transformation engine.

Example Operating Environment for Computer or Other Device

Figure 9:
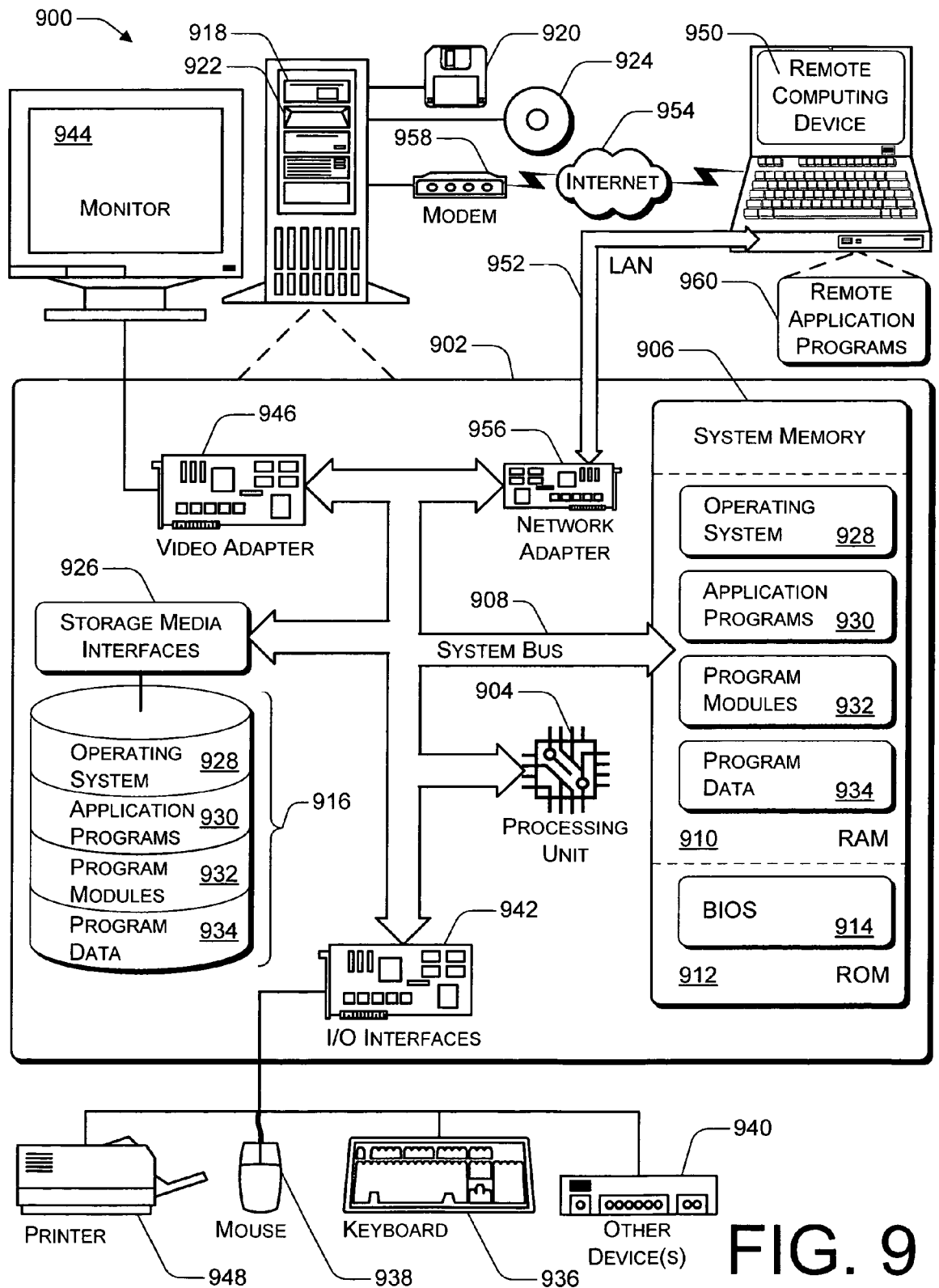
FIG. 9 illustrates an example of a computing (or general device) operating environment that is capable of (wholly or partially) implementing at least one aspect of programmable object models for bibliographies and citations as described herein.

FIG. 9 illustrates an example computing (or general device) operating environment 900 that is capable of (fully or partially) implementing at least one system, device, apparatus, component, arrangement, protocol, approach, method, procedure, media, application programming interface (API), some combination thereof, etc. for programmable object models for bibliographies and citations as described herein. Operating environment 900 may be utilized in the computer and network architectures described below.

Example operating environment 900 is only one example of an environment and is not intended to suggest any limitation as to the scope of use or functionality of the applicable device (including computer, network node, entertainment device, mobile appliance, general electronic device, etc.) architectures. Neither should operating environment 900 (or the devices thereof) be interpreted as having any dependency or requirement relating to any one or to any combination of components as illustrated in FIG. 9.

Additionally, implementations for programmable object models for bibliographies and citations may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for programmable object models for bibliographies and citations may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of programmable object models for bibliographies and citations, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 900 includes a general-purpose computing device in the form of a computer 902, which may comprise any (e.g., electronic) device with computing/processing capabilities. The components of computer 902 may include, but are not limited to, one or more processors or processing units 904, a system memory 906, and a system bus 908 that couples various system components including processor 904 to system memory 906.

Processors 904 are not limited by the materials from which they are formed or the processing mechanisms employed therein. For example, processors 904 may be comprised of semiconductor(s) and/or transistors (e.g., electronic integrated circuits (ICs)). In such a context, processor-executable instructions may be electronically-executable instructions. Alternatively, the mechanisms of or for processors 904, and thus of or for computer 902, may include, but are not limited to, quantum computing, optical computing, mechanical computing (e.g., using nanotechnology), and so forth.

System bus 908 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 902 typically includes a variety of processor-accessible media. Such media may be any available media that is accessible by computer 902 or another (e.g., electronic) device, and it includes both volatile and non-volatile media, removable and non-removable media, and storage and transmission media.

System memory 906 includes processor-accessible storage media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is typically stored in ROM 912. RAM 910 typically contains data and/or program modules/instructions that are immediately accessible to and/or being presently operated on by processing unit 904.

Computer 902 may also include other removable/non-removable and/or volatile/non-volatile storage media. By way of example, FIG. 9 illustrates a hard disk drive or disk drive array 916 for reading from and writing to a (typically) non-removable, non-volatile magnetic media (not separately shown); a magnetic disk drive 918 for reading from and writing to a (typically) removable, non-volatile magnetic disk 920 (e.g., a "floppy disk"); and an optical disk drive 922 for reading from and/or writing to a (typically) removable, non-volatile optical disk 924 such as a CD, DVD, or other optical media. Hard disk drive 916, magnetic disk drive 918, and optical disk drive 922 are each connected to system bus 908 by one or more storage media interfaces 926. Alternatively, hard disk drive 916, magnetic disk drive 918, and optical disk drive 922 may be connected to system bus 908 by one or more other separate or combined interfaces (not shown).

The disk drives and their associated processor-accessible media provide non-volatile storage of processor-executable instructions, such as data structures, program modules, and other data for computer 902. Although example computer 902 illustrates a hard disk 916, a removable magnetic disk 920, and a removable optical disk 924, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 900.

Any number of program modules (or other units or sets of processor-executable instructions) may be stored on hard disk 916, magnetic disk 920, optical disk 924, ROM 912, and/or RAM 910, including by way of general example, an operating system 928, one or more application programs 930, other program modules 932, and program data. 934. These processor-executable instructions may include, for example, objects, properties thereof, and/or calls thereto.

A user may enter commands and/or information into computer 902 via input devices such as a keyboard 936 and a pointing device 938 (e.g., a "mouse"). Other input devices 940 (not shown specifically) may include a microphone, joystick, game pad, satellite dish, serial port, video camera, scanner, and/or the like. These and other input devices are connected to processing unit 904 via input/output interfaces 942 that are coupled to system bus 908. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 944 or other type of display device may also be connected to system bus 908 via an interface, such as a video adapter 946. Video adapter 946 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 944, other output peripheral devices may include components such as speakers (not shown) and a printer 948, which may be connected to computer 902 via input/output interfaces 942.

Computer 902 may operate in a networked environment using logical connections to one or more remote computers, such as a remote computing device 950. By way of example, remote computing device 950 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 950 is illustrated as a portable computer that may include many or all of the elements and features described herein with respect to computer 902.

Logical connections between computer 902 and remote computer 950 are depicted as a local area network (LAN) 952 and a general wide area network (WAN) 954. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 902 is usually connected to LAN 952 via a network interface or adapter 956. When implemented in a WAN networking environment, computer 902 typically includes a modem 958 or other component for establishing communications over WAN 954. Modem 958, which may be internal or external to computer 902, may be connected to system bus 908 via input/output interfaces 942 or any other appropriate mechanism(s). It is to be appreciated that the illustrated network connections are examples and that other manners for establishing communication link(s) between computers 902 and 950 may be employed.

In a networked environment, such as that illustrated with operating environment 900, program modules or other instructions that are depicted relative to computer 902, or portions thereof, may be fully or partially stored in a remote media storage device. By way of example, remote application programs 960 reside on a memory component of remote computer 950 but may be usable or otherwise accessible via computer 902. Also, for purposes of illustration, application programs 930 and other processor-executable instructions such as operating system 928 are illustrated herein as discrete blocks, but it is recognized that such programs, components, and other instructions reside at various times in different storage components of computing device 902 (and/or remote computing device 950) and are executed by processor(s) 904 of computer 902 (and/or those of remote computing device 950).

Programmable Object Models for Bibliographies and Citations

Example implementations described herein relate generally to programmable object models for bibliographies and/or citations. For example, certain implementations may be realized using communications between different software objects in an object-oriented programming environment. In order to subsequently describe example programmable object model implementations, an object-oriented programming environment is described first with reference to FIG. 10.

Figure 10:
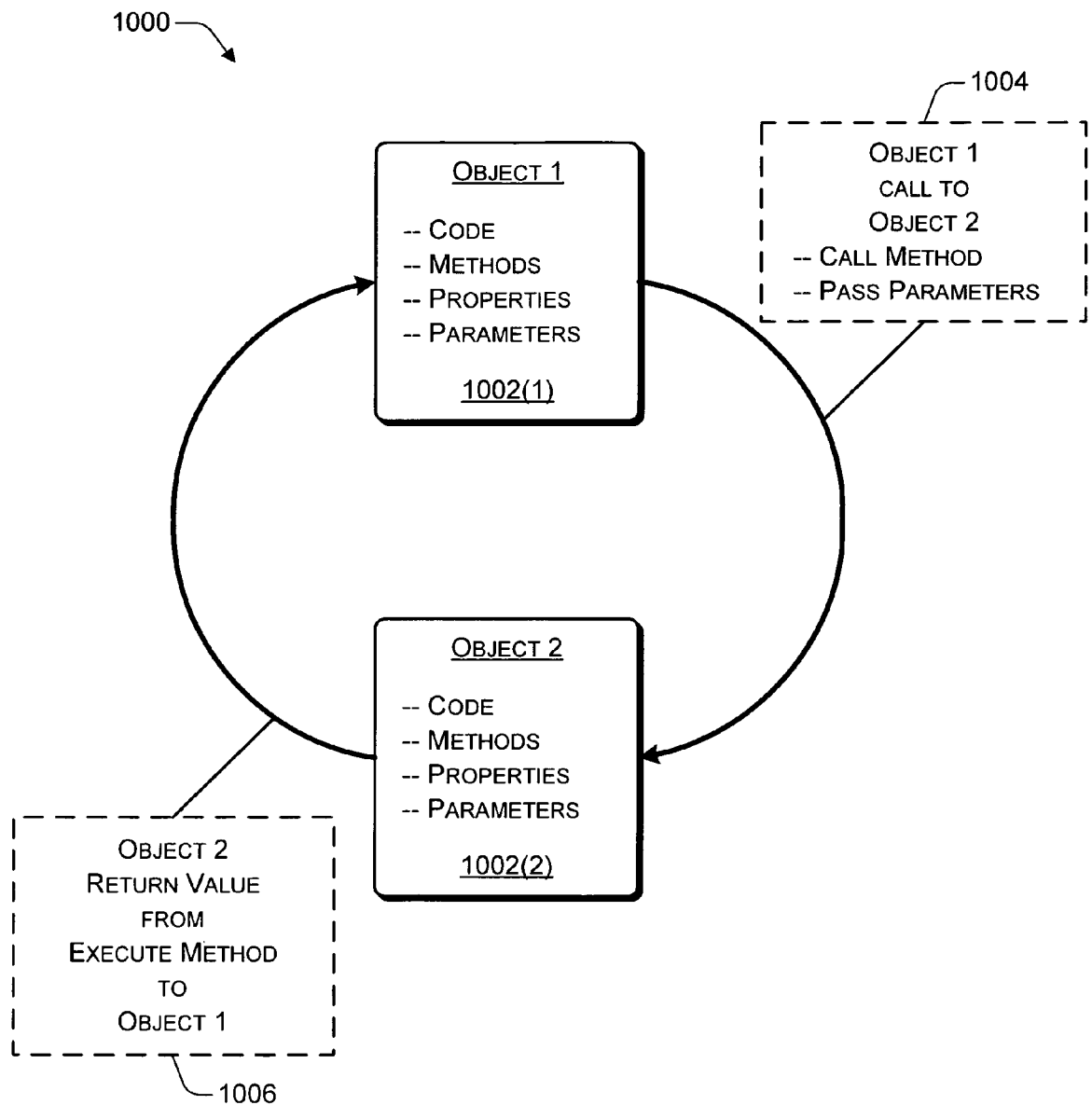
FIG. 10 illustrates an example interaction between two objects according to an object-oriented programming model.

FIG. 10 illustrates an example interaction 1000 between two objects 1002 according to an object-oriented programming model. Example interaction 1000 includes two objects 1002(1) and 1002(2) and two communication messages 1004 and 1006. Communication message 1004 is a call from a first object 1002(1) to a second object 1002(2). Communication message 1006 is a return of a value from second object 1002(2) to first object 1002(1).

According to an object-oriented programming environment, first object 1002(1) may include software code, executable methods, properties, and/or parameters. Similarly, second object 1002(2) may also include software code, executable methods, properties, and/or parameters.

First object 1002(1) can communicate with second object 1002(2) to obtain information or functionality from second object 1002(2) by calling second object 1002(2) via a message call 1004. More generally, in accordance with standard principles of object-oriented programming environments, first object 1002(1) can communicate with second object 1002(2) via APIs that enable two, possibly-disparate, software objects 1002 to communicate with each other in order to obtain information and/or functionality from each other.

For example, if first object 1002(1) requires the functionality provided by a method contained in second object 1002(2), first object 1002(1) can pass a message call 1004 to second object 1002(2). With the passing of message 1004, the first object identifies the requested method and also passes to the second object any required parameters that are relevant to (e.g., helpful for, required by, etc.) the second object when operating or performing the identified method. Thus, message call 1004 includes an identification of the requested method and parameters related thereto.

When second object 1002(2) receives message call 1004 from first object 1002(1), second object 1002(2) executes the called method based on the provided parameters. Second object 1002(2) then sends back to first object 1002(1) a return message 1006 that is related to the executed method. Thus, return message 1006 in this example includes at least one value obtained as a result of performing the requested method.

Figure 11:
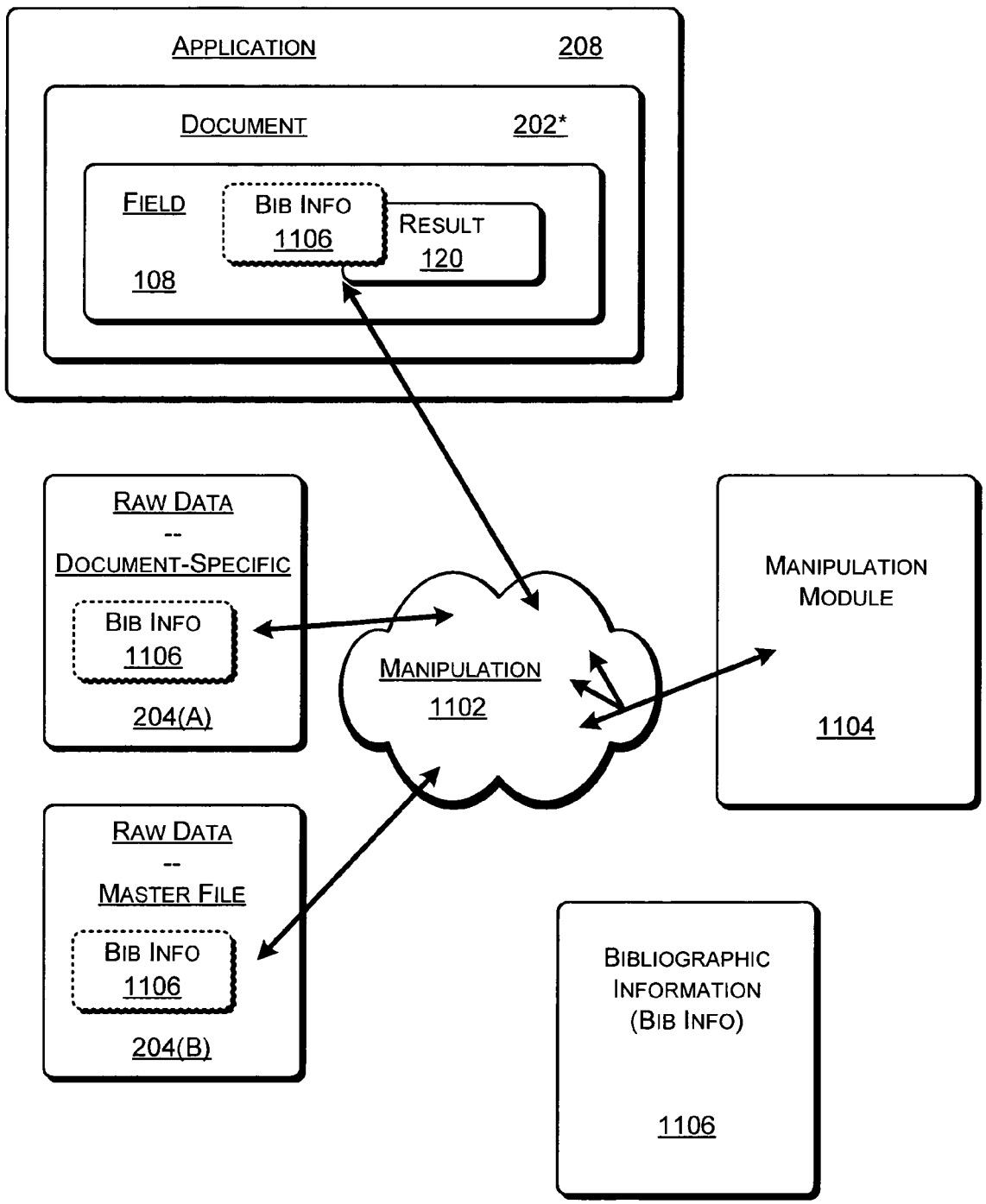
FIG. 11 illustrates an example manipulation of bibliography information between a manipulation module programmed to manipulate bibliography information and one or more of a document, a master file, and raw data.

FIG. 11 illustrates an example manipulation 1102 of bibliography information 1106 between a manipulation module 1104 programmed to manipulate bibliography information 1106 and one or more of a document 202*, document-specific raw data 204(A), and a master file of raw data 204(B). As illustrated, FIG. 11 includes an application 208, document-specific raw data 204(A), raw data master file 204(B), manipulation module 1104, a manipulation operation 1102, and general bibliographic information (Bib Info) 1106.

Application 208 is capable of accessing document 202*, which is an example of a presentable file 202 (of FIG. 2). Document 202* has a field 108 that includes a result 120. Field 108/result 120, document-specific raw data 204(A), and raw data master file 204(B) are examples of data that include bibliographic information 1106 as indicated by the three Bib Info 1106 blocks formed with dashed lines.

Raw data 204 is described generally herein above. Document-specific raw data 204(A) may be located separate from document 202*, as part of additional information 212 (of FIG. 2) of document 202*, and so forth. A master bibliographic information file, such as raw data master file 204(B), is discussed above with reference to FIG. 8 in the section entitled "Bibliographic-Related Example Implementations for Determining Fields".

Generally, raw data master file 204(B) is a file that includes many bibliographic entries for a user, an application, a computing device, some combination thereof, and so forth. Usually, raw data master file 204(B) includes bibliographic entries that are used and/or usable across multiple documents 202*. Bibliographic entries may be entered first into raw data master file 204(B) and then copied into a document 202*. Bibliographic entries may also be entered first into a document 202* and then copied into raw data master file 204(B).

Once a bibliographic entry is input into raw data master file 204(B), it may be retrieved by manipulation module 1104 (e.g., on be-half of an application 208) for use with another document 202*. Manipulation module 1104 is capable of accessing document 202*, document-specific raw data 204(A), and/or raw data master file 204(B) in order to perform a manipulation operation 1102 on bibliographic information that is part thereof. Generally, manipulation operations 1102 may be to input, to retrieve, to utilize, to copy, to remove, etc. bibliographic information 1106 with respect to field 108/result 120, document-specific raw data 204(A), and/or raw data master file 204(B).

According to example described implementations, an object-oriented programming model is provided to enable manipulation module 1104 to manipulate bibliographic information 1106. As shown, bibliographic information 1106 may be stored at, embedded in, or otherwise included as part of document 202*, document-specific raw data 204(A), and/or raw data master file 204(B). The manipulations may be effectuated via a set of APIs and/or object-oriented message calls. The object-oriented message calls may be communicated directly through one or more APIs, programmatically through other software application programs, some combination thereof, and so forth. The other software application programs may be those written according to a variety of programming languages such as, for example, C, C++, C#, Visual Basic, and the like.

More specifically, the manipulation operations 1102 that may be performed by manipulation module 1104 include, but are not limited to, general bibliographic information accessing, adding/inputting new bibliographic entries, retrieving bibliographic entries, merging bibliographic information, removing/deleting bibliographic entries, editing/replacing bibliographic entries, acquiring bibliographic source entry data, displaying bibliographic entries, interacting with citations, some combination thereof, and so forth. Manipulation module 1104 may be located at and/or executed from anywhere. For example, it may be separate from or incorporated into another application. For instance, manipulation module 1104 may be a plug-in to application 208, a standalone application that can be used to manipulate bibliographic information, and so forth.

Although not explicitly shown in FIG. 11, a schema 220 is described herein above with particular reference to FIG. 2. Schema 220 may also, for example, define portions of document 202*, including bibliographic information 1106 therein that is to be presented as citations. The citations may be included in document 202* using, for example, manipulation module 1104. The schema 220 that is used to define bibliographic information 1106 in document 202* can take a variety of forms. In one example, schema 220 is formatted in accordance with XML and configured according to the schema description in U.S. patent application Ser. No. 11/280,609, which is filed on even date herewith and entitled "Extensible Markup Language Schema for Bibliographies and Citations."

Example Objects for APIs and/or Message Calls

The description below is primarily directed to example objects and associated properties comprising APIs and/or object-oriented message calls that enable manipulation of bibliographic information within and among various files (e.g., document 202*, document-specific raw data 204(A), raw data master file 204(B), etc.). Following each of the objects and associated properties is a description of the operation and/or functionality of the object or associated property. They may be implemented as modules (including modules of manipulation module 1104).

Seven (7) general example object model actions are listed and described below. However, these seven actions may be modified, and/or additional object model actions may be utilized in alternative implementations:
  (1) Generate Bibliography: Bibliographic information is created and added to a document. (For example, generating a bibliography may cause an entire source collection to be inserted into a given document.)
  (2) Insert Citation: A citation is inserted into a document.
  (3) Copy Sources—Master to Document: One or more sources are copied from a master list into a document.
  (4) Copy Sources—Document to Master: One or more sources are copied from a document into a master list.
  (5) Select a New Master List: A new master list that is currently being referenced and that can provide bibliographic information is selected.
  (6) Select a New Style: A new style for the citations within a document may be selected.
  (7) Other Object Model Action Examples: Information about the number of sources, the number of styles, the names, etc. may be acquired.

There are four subsections below: two data collections, one individual data item of information, and two bibliography properties are described below. The two data collections are ActiveDocument.Bibliography.Sources and Application.Bibliography.Sources. The individual data item is Bibliography.Source. The two bibliography properties are Application.Options.BibliographyStyle and Application.Options.BibliogrpahySort.

ActiveDocument.Bibliography.Sources:
ActiveDocument.Bibliography.Sources is a collection of data sources that are attached to a current active document.
  ActiveDocument.Bibliography.Sources.Add(XML)
    It adds a new data source to the current list. The new data source is specified by the provided XML.
    The provided "XML" is the bibliography source, and its format comports with a predetermined XML schema. By way of example only, it may comport with the XML schema described in U.S. patent application Ser. No. 11/280,609, which is filed on even date herewith and entitled "Extensible Markup Language Schema for Bibliographies and Citations."
  ActiveDocument.Bibliography.Sources.Delete(XML)
    It removes a source from the current document.
    The provided "XML" is the bibliography source, and its format comports with a predetermined XML schema.

Common properties and methods for collections are:
  Bibliography.Sources.Count (returns the number of sources in the collection)
  Bibliography.Sources.Creator (returns the creator of the data sources collection)
  Bibliography.Sources.Parent (returns the parent object of the data sources collection)
  Bibliography.Sources.Item(Index) (returns the indicated selected element of the data sources collection)
Application.Bibliography. Sources:
Application.Bibliography.Sources is a collection of data sources forming a master list. It defaults to the master list currently selected for the document.
  Application.Bibliography.Sources.Add(XML)
    It adds a new source to the master list. The new data source is specified by the provided XML.
    The provided "XML" is the bibliography source, and its format comports with a predetermined XML schema.
  Application.Bibliography.Sources.Delete(XML)
    It removes a source from the master list.
    The provided "XML" is the bibliography source, and its format comports with a predetermined XML schema.
Bibliography. Source:
Bibliography.Source is an individual source of the Bibliography. Sources Collection.
  Bibliography.Source.Tag
    It returns the tag of the currently-selected source.
  Bibliography.Source.Delete
    It removes the currently-selected source from the list.
    If there are citations to this source, the source is protected from deletion.
  Common methods and properties for individual sources are:
  Bibliography.Source.Application (returns the application that is using the identified source)
  Bibliography.Source.Creator (returns the creator of the identified source)
  Bibliography.Source.Index (returns the index of the identified source within a given source collection)
  Bibliography.Source.Next (returns the next source after the identified source in a given source collection)
  Bibliography.Source.Previous (returns the previous source before the identified source in a given source collection)
  Bibliography.Source.Cited (returns an indication of whether or not the identified source is cited in the current document)
  Bibliography.Source.XML (returns the XML representation of the source)
  Bibliography.Source.Field (returns an indicated individual field within a source; e.g., Bibliography.Source.Field ("Title") returns the title, Bibliography.Source.Field ("Year") returns the year, etc.)
Application.Options.BibliographyStyle:
Application.Options.BibliographyStyle(Style)
  It is a read/write property that sets or returns the name of the currently-active style. Example values include MLA, APA, etc.
Application.Options.BibliographySort:
Application.Options.BibliographySort(Sort)
  It is a read/write property that sets or returns an identification of the currently-active sorting parameter that defines how sources are sorted for viewing in the source manager. Example values include Sort by Author, Sort by Title, Sort by Year, Sort by Tag Name, and so forth.

The devices, actions, aspects, features, functions, procedures, modules, data structures, objects, components, etc. of FIGS. 1-11 are illustrated in diagrams that are divided into multiple blocks. However, the order, interconnections, interrelationships, layout, etc. in which FIGS. 1-11 are described and/or shown is not intended to be construed as a limitation, and any number of the blocks can be modified, combined, rearranged, augmented, omitted, etc. in any manner to implement one or more systems, methods, devices, procedures, media, apparatuses, object models, APIs, arrangements, etc. for programmable object models for bibliographies and citations. Furthermore, although the description herein includes references to specific implementations (including a general device of FIG. 9), the illustrated and/or described implementations can be realized in any suitable hardware, software, firmware, or combination thereof.

Thus, although systems, media, devices, methods, procedures, apparatuses, techniques, schemes, approaches, procedures, object models, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as example forms of implementing the claimed invention.

What is claimed is:

1. A computing device comprising:
    a processor; and
    a memory coupled to the processor, the memory storing computer-program instructions comprising:
        a programmable object model for accessing one or more bibliographic sources in a document of a word processing application via one or more object-oriented message calls, the programmable object model comprising a manipulation module programmed to manipulate the one or more bibliographic sources in the document via a first object model action including a requested method that passes a message and one or more parameters relevant to manipulating the one or more bibliographic sources from a first object to a second object, the second object returning a return message that includes one or more values obtained as a result of performing the requested method,
        wherein the first object model action is communicated directly by a combination of one or more Application Programming Interfaces (APIs) and one or more software application programs,
        wherein the manipulation module forms at least a portion of a standalone application that is separate from the word processing application; and
        a style-setting module programmed via a second object model action to set a first citation style for bibliographic citations in the document to be a citation style that is identified by a first style name, wherein the manipulation module is programmed to repurpose the first citation style to a second, different citation style that is identified by a second, different style name.

2. The computing device as recited in claim 1, further comprising an addition module programmed to add a bibliographic source from a master list to the document.

3. The computing device as recited in claim 1, further comprising a deletion module programmed to delete a bibliographic source from the document.

4. The computing device as recited in claim 1, further comprising an addition module programmed to add a bibliographic source from the document to a master list.

5. The computing device as recited in claim 1, further comprising a deletion module programmed to delete a bibliographic source from a master list.

6. The computing device as recited in claim 1, further comprising a master-list-setting module programmed to set a current master list to be a master list that is identified by a file name.

7. One or more computer-readable storage media storing computer-executable instructions for programmatically manipulating bibliographic information for a document that, when executed on one or more processors, perform acts comprising:
    accessing bibliographic information of a word processing document using an object model via one or more object-oriented message calls; and
    manipulating via an object model action one or more bibliographic sources of the document using the bibliographic information including a requested method that passes a message and one or more parameters relevant to manipulating the one or more bibliographic sources from a first object to a second object, the second object returning a return message that includes one or more values obtained as a result of performing the requested method,
    wherein the first object model action is communicated directly by a combination of one or more Application Programming Interfaces (APIs) and one or more software application programs,
    wherein the manipulating comprises: changing a citation style via a selection of a new presentation rule that determines how multiple citations corresponding to the one or more bibliographic sources of the document are formatted during presentation of the document, wherein the new presentation rule is included in the document.

8. The computer-readable storage media as recited in claim 7, wherein the manipulating comprises:
    deleting a bibliographic source of the one or more bibliographic sources from the document.

9. The computer-readable storage media as recited in claim 7, wherein the manipulating comprises:
    adding a bibliographic source to the one or more bibliographic sources of the document.

10. The computer-readable storage media as recited in claim 7, wherein the manipulating comprises:
    retrieving a tag associated with a bibliographic source of the one or more bibliographic sources of the document.

11. The computer-readable storage media as recited in claim 7, wherein the manipulating comprises:
    utilizing a read/write property of a citation that corresponds to a bibliographic source of the one or more bibliographic sources of the document.

12. The computer-readable storage media as recited in claim 7, wherein the manipulating comprises:
    causing a citation, which corresponds to a bibliographic source of the one or more bibliographic sources, to be displayed as the citation is to appear during presentation of the document.

13. One or more processor-accessible storage media comprising processor-executable instructions that, when executed, direct a device to perform actions comprising:
    accessing bibliographic information of a word processing document using an object model via one or more object-oriented message calls;
    manipulating via a first object model action the bibliographic information with one or more objects including a requested method that passes a message and one or more parameters relevant to manipulating one or more bibliographic sources from a first object to a second object, the second object returning a return message that includes one or more values obtained as a result of performing the requested method, wherein the first object model action is communicated directly by a combination of one or more Application Programming Interfaces (APIs) and one or more software application programs;

converting the bibliographic information via a second object model action into multiple citations in the word processing document, the citations being formatted according to a citation style, and wherein each citation style is selected by choosing a particular presentation rule that is included in the document;

inserting a citation via a third object model action;

adding via a fourth object model action a bibliography source to be modified using an extensible markup language data structure, the bibliography source including a field within a source; and changing the bibliography via a fifth object model action from a first bibliographic citation style to a second bibliographic citation style, wherein modification comprises repurposing the bibliography by changing selected presentation rules contained in a word processing document.

14. The one or more processor-accessible storage media as recited in claim 13, further comprising the one or more objects, at least one object of the one or more objects holding at least part of the bibliographic information.

15. The one or more processor-accessible storage media as recited in claim 13, wherein the processor-executable instructions, when executed, direct the device to perform a further action comprising:

removing a bibliographic source from a current master list.

16. The one or more processor-accessible storage media as recited in claim 13, wherein the processor-executable instructions, when executed, direct the device to perform a further action comprising:

adding a bibliographic source to a current master list directly; or adding a bibliographic source to a current master list from a document.

17. The one or more processor-accessible storage media as recited in claim 13, wherein the processor-executable instructions, when executed, direct the device to perform a further action comprising:

returning an indicated bibliographic source from a collection of bibliographic sources.

18. The computer-readable storage media, as recited in claim 7, wherein the computer-executable instructions, when executed on the one or more processors perform further acts comprising:

transforming multiple sets of bibliographic citation presentation rules, the multiple sets of presentation rules including at least one set of presentation rules having a particular presentation rules subset that targets a particular data item type, wherein the transformation engine is configured to repurpose a bibliography from a first citation style to a second citation style by replacing a first set of bibliographic presentation rules with a second set of bibliographic presentation rules, wherein the transformation engine exists as part of an operating system and separately from an application that is capable of applying the transformation engine to at least the particular data item.

19. The one or more processor-accessible storage media, as recited in claim 13, wherein the processor-executable instructions, when executed, direct the device to perform further actions comprising:

transforming multiple sets of bibliographic citation presentation rules, the multiple sets of presentation rules including at least one set of presentation rules having a particular presentation rules subset that targets a particular data item type, wherein the transformation engine is configured to repurpose a bibliography from a first citation style to a second citation style by replacing a first set of bibliographic presentation rules with a second set of bibliographic presentation rules, wherein the transformation engine exists as part of an operating system and separately from an application that is capable of applying the transformation engine to at least the particular data item.

* * * * *